J. PISZCZOR.
CAR CONSTRUCTION.
APPLICATION FILED JULY 2, 1918.
1,312,134.
Patented Aug. 5, 1919.
2 SHEETS—SHEET 1.
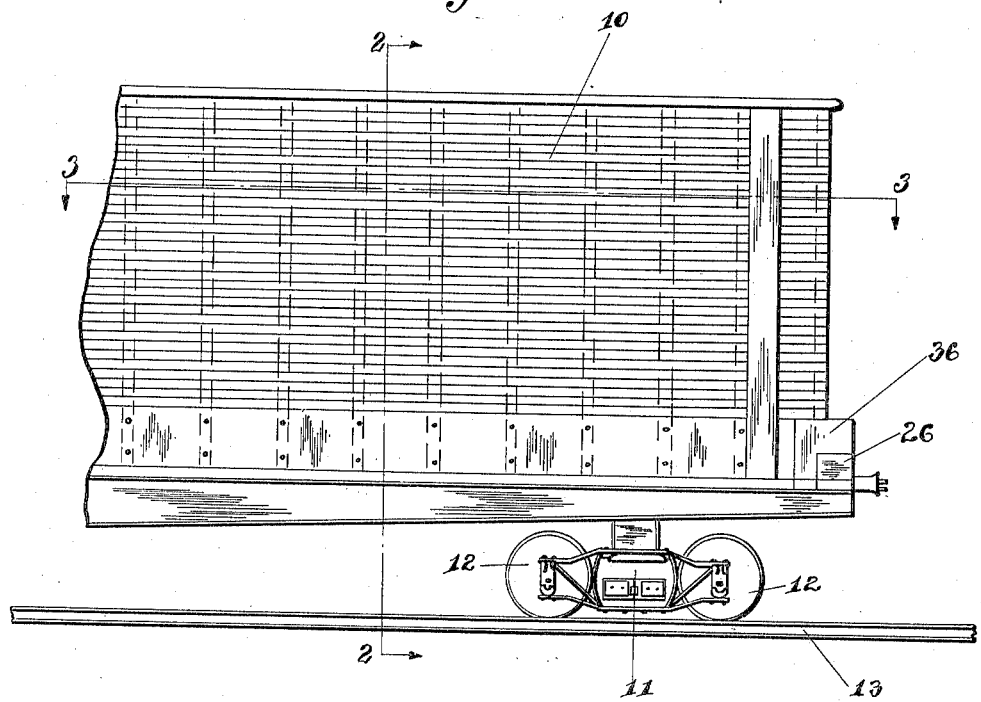
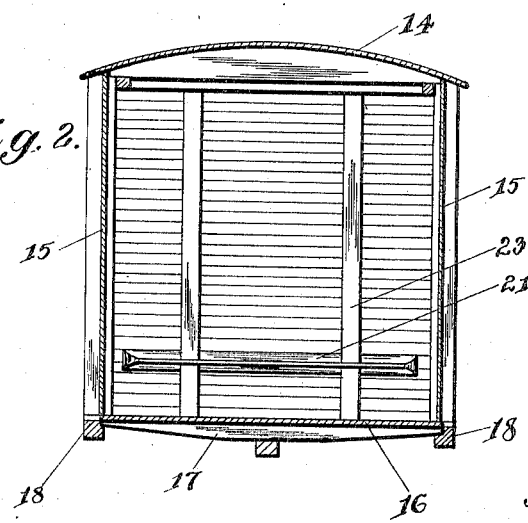
INVENTOR
Joseph Piszczor.
BY Oscar Geier
his ATTORNEY J. PISZCZOR.
CAR CONSTRUCTION.
APPLICATION FILED JULY 2, 1918.
1,312,134.
Patented Aug. 5, 1919.
2 SHEETS—SHEET 2.
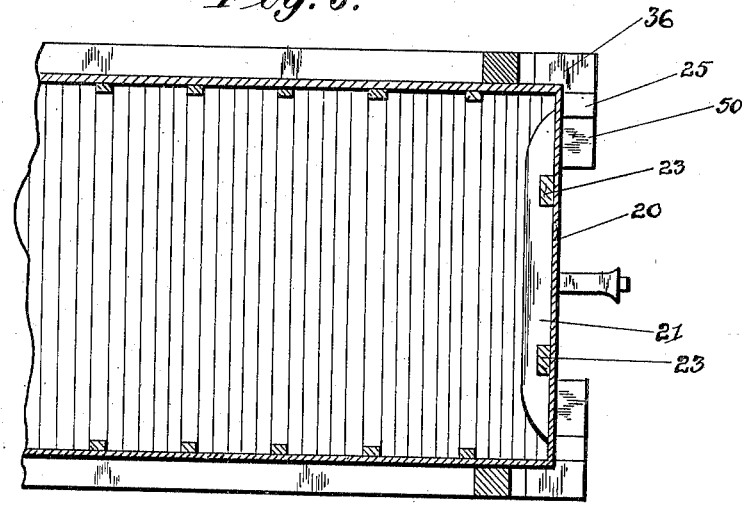
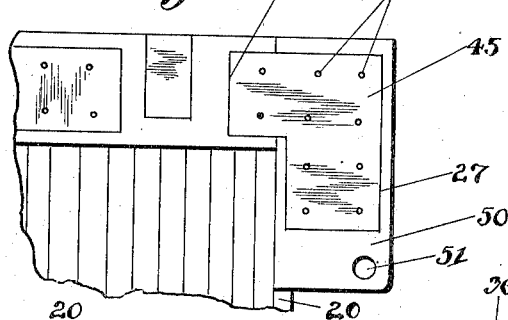
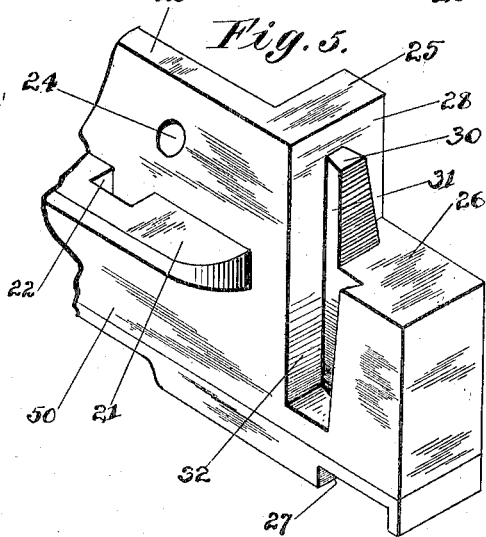
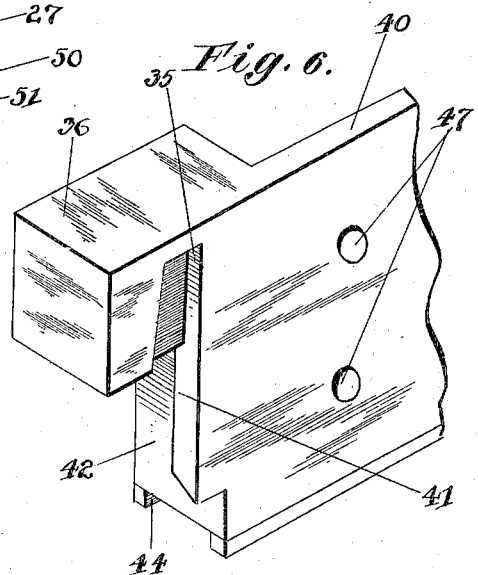
INVENTOR
Joseph Piszczor.
BY
ATTORNEY

UNITED STATES PATENT OFFICE.

JOSEPH PISZCZOR, OF BRAINERD, MINNESOTA.

CAR CONSTRUCTION.

1,312,134.     Specification of Letters Patent.     Patented Aug. 5, 1919.

Application filed July 2, 1918. Serial No. 242,996.

*To all whom it may concern:*

Be it known that I, JOSEPH PISZCZOR, a citizen of Poland, residing at Brainerd, county of Crow Wing, and State of Minnesota, have invented certain new and useful Improvements in Car Construction, of which the following is a specification.

This invention relates to improvements in jointed structures and particularly to the construction of cars.

The principal object of the invention is to provide means whereby the main elements of a car frame or body are firmly interengaged and locked together by the peculiar conformation given to their contacting surfaces.

A further object provides a structure which is essentially rigid when erected, the use of bolts, screws, rivets and like securing means being largely obviated.

These and other like objects are attained by the novel construction and combination of parts hereinafter described and shown in the accompanying drawings, forming a material part of this disclosure, and in which:

Figure 1 is a fragmentary side elevational view showing a conventional type of freight car, and indicating the application of the invention.

Fig. 2 is a transverse vertical sectional view taken on line 2—2 of Fig. 1.

Fig. 3 is a fragmentary horizontal sectional view taken on line 3—3 of Fig. 1.

Fig. 4 is an enlarged fragmentary view, showing the joints in an assembled position.

Fig. 5 is a perspective view, showing one end of the lower end elements of the car frame, and, Fig. 6 is a similar perspective view, showing an end of one of the side car frame elements.

Referring now more particularly to Fig. 1, the car, designated by the numeral 10, is shown to be resting upon a truck 11, furnished with the usual type of car wheels 12, which rest upon the rails 13, the top of the car being provided with a curved roof 14, and the usual sides 15 engaged with a floor 16, supported by transverse beams 17, carried in the side beams 18 as usual.

The end beams 20 of the structure have on their inner sides extensions 21, containing openings 22 in which the stakes 23 may be rigidly engaged, openings 24 extending through the plates 20 for the reception of bolts or like fastenings.

Formed on the outer side of the end elements are projections 25, turned at right angles, and having extending ends 26 substantially rectangular in cross section, these extensions having recesses 27 in their lower sides, and formed on the flat surface 28 of the member 25 is a vertical, dove-tailed angular projection 30, having a beveled wall 31 extending downward into a recess 32 in the same plane as the surface 28, the projection 30 being adapted to extend into a corresponding undercut opening or recess 35, formed in a projection 36, extending from the plate side element 40, while the beveled surface 41 of the plate 40 is adapted to make contact with the corresponding surface 31 of the plate 20, the extension 26 of the end plate 20 engaging with the surface 42 of the side plate 40.

Formed in the lower portion of the side element 40 is a recess 44, the same being made to a corresponding depth with the recess 27 and adapted to receive a securing plate 45, which is held therein by nails or screws 46, thus holding the end and side elements in rigid engagement, openings 47 passing through the plate 40 for the reception of bolts.

Extending out from the end element 20 is a plate 50 having an opening 51 by means of which other bolts may be entered, securing the end of the car frame structure rigidly together, and due to the inter-locking or inter-engaging end elements, it will be seen that a relatively rigid structure may be built without the use of the excessive number of bolt securing means as is commonly employed.

Having thus described my invention what I claim as new, and desire to secure by Letters Patent is:

A car bottom construction of the character described, consisting of end and side elements to which the car bottom proper is to be secured, said end elements comprising a right angular body, an extension formed with said body, recessed at its lower face, a vertical dove-tailed projection having beveled walls formed on the flat vertical face of said body at the side of the extension, said projection extending into a recess formed in said extension and by said flat face of the body, said side elements comprising an angular body, having an undercut recess for the reception of the vertical dove-tailed projection of said end elements, and a flat face adapted to engage with the flat face of the extension of said end elements, the body of said side element having a recess at its lower face, securing plates adapted to fit into the recess of the lower face of said end and side elements, and inner side extensions on said end elements provided with openings for the reception of the vertical stakes to which the boards of the car body are to be secured, substantially as described and for the purpose set forth.

In testimony whereof I have affixed my signature.

JOSEPH PISZCZOR.

Copies of this patent may be obtained for five cents each, by addressing the "Commissioner of Patents, Washington, D. C."